(12) United States Patent
Robinson

(10) Patent No.: US 8,873,106 B2
(45) Date of Patent: Oct. 28, 2014

(54) METHOD AND SYSTEM FOR ENABLING HALFTONING OF A COLOR IMAGE BASED ON ITS COLOR SEPARATION CONTENT

(71) Applicant: Xerox Corporation, Norwalk, CT (US)

(72) Inventor: David Robinson, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/790,235

(22) Filed: Mar. 8, 2013

(65) Prior Publication Data

US 2014/0253975 A1 Sep. 11, 2014

(51) Int. Cl.
*H04N 1/40* (2006.01)
*G06K 15/02* (2006.01)

(52) U.S. Cl.
CPC .................................. *G06K 15/1881* (2013.01)
USPC .............................. 358/2.1; 358/515; 358/518

(58) Field of Classification Search
CPC . H04N 1/52; H04N 1/405; H04N 2201/0082; H04N 1/60; H04N 1/642; H04N 1/4052; H04N 1/4092; H04N 1/54; H04N 1/46; H04N 1/6058; G06K 15/02; G06K 15/00; G06K 2215/0094; B41J 2/2132; B41J 11/008
USPC ........ 358/1.9, 2.1, 3.03–3.06, 3.27, 3.13, 3.2, 358/3.26, 515, 518, 1.18, 500, 502, 504; 382/168–172
See application file for complete search history.

(56) References Cited

U.S. PATENT DOCUMENTS

| 6,021,217 | A  | * | 2/2000  | Nakahara   | 382/169  |
|-----------|----|---|---------|------------|----------|
| 6,346,993 | B1 | * | 2/2002  | Curry      | 358/1.9  |
| 7,119,928 | B2 | * | 10/2006 | Harrington | 358/3.2  |
| 7,199,905 | B2 | * | 4/2007  | Sharma     | 358/3.04 |
| 8,681,382 | B1 | * | 3/2014  | Mealy      | 358/3.06 |
| 2006/0077468 | A1 |   | 4/2006  | Loce et al. |         |

* cited by examiner

*Primary Examiner* — Thomas D Lee
*Assistant Examiner* — Stephen M Brinich
(74) *Attorney, Agent, or Firm* — Pillsbury Winthrop Shaw Pittman, LLP

(57) ABSTRACT

A method for enabling halftoning of an image based on its color separation content is provided. The method provides better image quality and includes: analyzing image data to determine whether one or more pixels of a plurality of input pixels are separation overlay pixels having colorant requests from multiple contone planes; and halftoning the pages of the color image to produce an output color image based on the following: if a page of the color image includes more than a threshold amount of separation overlay pixels and if a property of the separation overlay pixels exceeds a predetermined threshold value, then a first halftoning model of the image printing device is used to halftone that page of the color image, else a second halftoning model, which includes an adjustment of a property of a halftone dot in the output image, is used to halftone that page of the color image.

22 Claims, 3 Drawing Sheets

METHOD AND SYSTEM FOR ENABLING HALFTONING OF A COLOR IMAGE BASED ON ITS COLOR SEPARATION CONTENT

BACKGROUND

1. Field

The present disclosure relates to a system and a method for enabling halftoning of a color image based on its color separation content.

2. Description of Related Art

For raster type color image printing systems, which have been implemented with various print engines such as electrostatographic print engines and ink jet print engines, Page Description language (PDL) pages or other input pages or sheets are Raster Image Processed (RIPed) to a continuous tone image data (or contone compressed format).

Raster type color image printing systems commonly employ halftoning to transform the continuous tone (contone) image data to print data that is printed as an array of dots that are of substantially similar size. For example, 8 bits per pixel per primary continuous tone (contone) image data is halftoned to one-bit data per pixel per primary color. Halftoning is traditionally performed on a print engine of the image printing system for color adjustment reasons. Halftoning may occur on a Digital Front End (DFE) of the image printing system.

In printing color documents, obtaining the desired density of a particular color is accomplished by halftoning, where separation density variation is represented by marking greater or fewer numbers of ON pixels (binary) in a distinct area of a separation. In a halftoning method known as dithering, or screening or halftoning, a value representing the density of each color separation pixel of an array of separation pixels within the area is compared to one of a set of preselected thresholds (i.e., stored as a dither matrix or halftone screen). The effect of such an arrangement is that for an area where the image density of the color separation lies between the maximum and minimum levels, some of the thresholds within the dither matrix will be exceeded while others will not. In the binary case, the separation pixels for which the thresholds are exceeded might be printed as a maximum colorant value, while the remaining separation pixels are allowed to remain white, dependent on the actual physical quantity described by the data.

While widely accepted as a method for rendering color prints of digital images, halftoning and the resulting halftone dot pattern may sometimes create image quality problems. For instance, when a halftone dot pattern is used to render edges in text and other objects with fine detail, the halftone structure may cause edge raggedness. Also, when halftone color separations are superimposed over other halftone color separations in a multiple color separation image, moire and other pattern artifacts may occur. Reduction of pattern artifacts consumes a great deal of effort when designing halftone screens for a printer or other image output device. Much effort has been spent on techniques to avoid pattern artifacts when printing multiple separation color halftones; however, some undesirable patterns still remain and may be found in commonly printed material.

On the digital image printing systems, customer selected halftone dots use the same dot angle and frequency without any analysis of the page/object/job separation content. Most conventional halftoning assumes that four colors (colorants) will be printed and halftone screens are selected accordingly. A downside of such an algorithm is that printed output for single or dual separation content may be grainy or noisy and the dot may be more noticeable due to sub-optimal dot angle design as opposed to a dot designed for the single or dual separation content.

Therefore, it would be desirable to have a halftone screen selection process that could be performed within an image path (i.e., automatically) and localized to color separation content within a color image.

SUMMARY

In one embodiment, a method for enabling halftoning of a color image based on its color separation content is provided. The method is implemented in a computer system comprising one or more processors configured to execute one or more computer program modules. The color image includes a plurality of color separations and each color separation represents a distinct colorant of an image printing device. The method includes receiving a color image being described as a plurality of input pixels and having a plurality of pages; processing the received color image to generate image data, the image data comprising a plurality of continuous tone planes; analyzing the image data to determine whether one or more pixels of the plurality of input pixels are separation overlay pixels having colorant requests from multiple continuous tone planes; and halftoning the pages of the color image to produce an output color image. Halftoning is based on the following: if a page of the color image includes more than a threshold amount of separation overlay pixels and if a property of the separation overlay pixels exceeds a predetermined threshold value, then a first halftoning model of the image printing device is used to halftone that page of the color image, else a second halftoning model is used to halftone that page of the color image, the second halftoning model comprising an adjustment of a property of a halftone dot in the output color image.

In another embodiment, a system for enabling halftoning of a color image based on its color separation content is provided. The color image includes a plurality of color separations and each color separation represents a distinct colorant of an image printing device. The system includes at least one processor configured to: receive a color image being described as a plurality of input pixels and having a plurality of pages; process the received color image to generate image data, the image data comprising a plurality of continuous tone planes; analyze the image data to determine whether one or more pixels of the plurality of input pixels are separation overlay pixels having colorant requests from multiple continuous tone planes; and halftone the pages of the color image to produce an output color image. Halftoning is based on the following: if a page of the color image includes more than a threshold amount of separation overlay pixels and if a property of the separation overlay pixels exceeds a predetermined threshold value, then a first halftoning model of the image printing device is used to halftone that page of the color image, else a second halftoning model is used to halftone that page of the color image, the second halftoning model comprising an adjustment of a property of a halftone dot in the output color image.

Other objects, features, and advantages of one or more embodiments will become apparent from the following detailed description, and accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

The present disclosure proposes analyzing Raster Image Processed (RIPed) pages and sheets of an input image to determine if separation overlays exist. The overlays are determined by comparing the overlapping pixels composing a page. If a compared pixel results in a TRUE value (i.e., multiple planes have a colorant request on the same pixel), the halftone designation for the page's pixels uses a device's standard halftoning. If no overlap is determined, an optimal halftoning for the present separation (i.e., with a defined halftone dot pattern) is used. The Raster Image Processed (RIPed) page may include a global tag that is configured to record the halftoning model being used.

If one or more pages to be imposed on the same sheet side have the tag stating that standard halftoning is to be used, the remaining pages on that sheet side are updated to use the same standard halftoning. The sheet side, as used herein, generally refers to one side of a media sheet on which images (e.g., text and/or graphics) are created/printed by the image printing system with an ink or marking material. The terms media and paper may be used interchangeably and either term is intended to apply to any type of printable material. The imposition optionally renders two or more images or pages on a single printed sheet, and examples include rendering two pages in a "two-up" imposition, four pages in a "four-up" imposition, etc. For example, two logical 8½ by 11 pages may be printed on a single 11 by 17 sheet, where one of the two 8½ by 11 pages is referred to the left side of the sheet side and the other of the two 8½ by 11 pages is referred to the right side of the sheet side.

Figure 1:
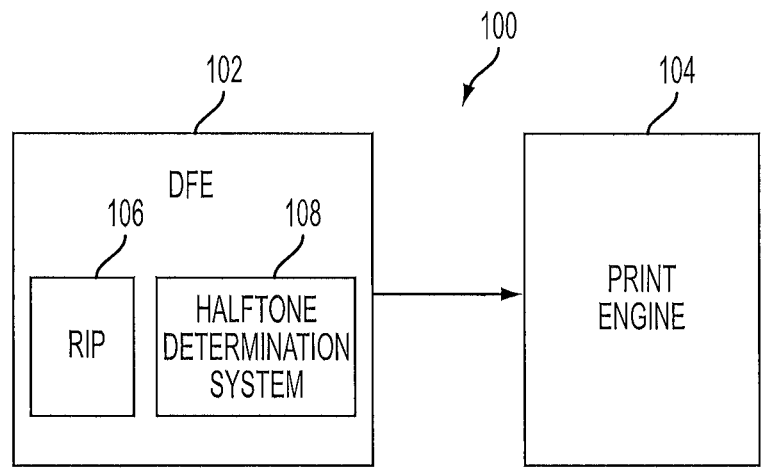
FIG. 1 shows an exemplary image printing system having a halftone determination system in accordance with an embodiment of the present disclosure.
Figure 2:
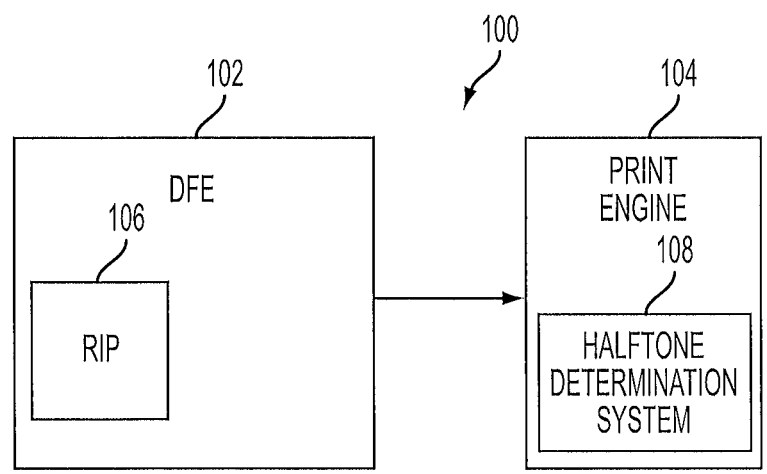
FIG. 2 shows another exemplary image printing system having a halftone determination system in accordance with another embodiment of the present disclosure.

FIGS. 1 and 2 show exemplary image printing systems, each having a system for enabling halftoning of a color image based on its color separation content in accordance with embodiments of the present disclosure.

The image printing system 100 generally includes an input device or a Digital Front End (DFE) 102 and a print engine 104 (or marking engine) for applying toner or ink to an image bearing surface, such as a photoreceptor belt or drum, where the belt then transfers the images to a substrate. Alternately, the print engine 104 may apply the toner or ink directly to the substrate.

The input device or DFE 102, as used herein, generally refers to an application that typically takes the form of a general purpose computer executing DFE Application Software, or takes the form of a special purpose computer (such as an Application-Specific Integrated Circuit (ASIC)), as are widely known in the digital document reproduction arts. The DFE is able to load input files (such as Postscript files) composed of images from various input network sources (e.g., a scanner, a digital camera, etc.) and process the files so that they can be output on digital equipment, for example, a small desktop printer or a large digital press. The DFE includes various function processors, e.g., a Raster Image Processor (RIP) 106, an image positioning processor, an image manipulation processor, a color processor, or an image storage processor. In some embodiments, the DFE permits a user to set up parameters such as layout, font, color, paper type, or post-finishing options.

The DFE 102 is configured to receive an input job or jobs. The DFE 102 is configured to output images of the received jobs intended to be printed. The received job may include images as part of its content. The received job may be color image data representing a color image.

The RIP 106 of the image printing system 100 generally converts or rasterizes input files into a print-ready form (e.g., image bitmaps) acceptable by the print engine 104. The input files may include a page description in a high-level page description language or another bitmap of higher or lower resolution than the output device (e.g., print engine). The print-ready form (e.g., raster image or bitmap/bytemap) produced by the RIP is then sent to the print engine 104 for output. In illustrated embodiments of FIGS. 1 and 2, the RIP 106 is implemented as an integral component of the DFE 102. However, in other embodiments, the RIP 106 may be implemented as a separate system from the DFE 102.

The DFE 102 (with the RIP 106) produces "N" separations or image planes or continuous tone planes of the content of each received image. The RIP 106 is configured to Raster Image Process (RIP) the image containing CMYK content. For example, CMYK image content includes Cyan (C) image content, Magenta (M) image content, Yellow (Y) image content, and Black (K) image content. Cyan image content, Magenta image content, Yellow image content, and Black (K) image content are each on one of the four image separations or color planes or continuous tone planes. DFE 102 may produce four image separations of an exemplary CMYK image (not shown). An output from the image printing system has these images (i.e., image planes or separations) superimposed on each other. The print engine 104 is configured to accept the N-separation image from the DFE 102 or the RIP 106.

The print engine 104 receives the rasterized image bitmap from the DFE 102 or the RIP 106 and renders the bitmap into a form that controls the image printing process from the exposure device to transferring the print image onto the image bearing surface, such as a photoreceptor belt or drum. The print engine 104 may mark xerographically; however, it will be appreciated that other marking technologies may be used, for example by ink-jet marking, ionographically marking or the like. The print engine 104 may be operatively connected one or more sources of printable substrate media, an output path and a finishing system. The print engine 104 may be a multi-color engine having a plurality of imaging/development subsystems that are suitable for producing individual color images. A stacker device may also be provided for the print engine 104 as known in the art. The finishing system applies features such as protection, glossing, or binding to the prints. The finishing system may be implemented as an integral component of the image printing system, or as a separate system through which prints are fed after they are printed.

The image printing system 100 also includes a halftone determination system 108. The halftone determination system 108 of the present disclosure provides a technique for enabling halftoning of a color image based on its color separation content. In one embodiment, as shown in FIG. 1, the halftone determination system 108 is implemented as a component of the DFE 102. That is, in the system 100 as shown in FIG. 1, the DFE 102 selects halftoning models to be used for the color image based on its color separation content. This would be done after RIP 106 Raster Image Processes (RIPes) the input files, but prior to sending the image data to the print engine 104. In another embodiment, as shown in FIG. 2, the halftone determination system 108 is implemented as a component of the print engine 104.

The basic structure and operation of the system 108 in both these embodiments of FIGS. 1 and 2 remain the same. The system 108 generally includes one or more processors performing the functions described below.

The halftone determination system 108 is configured to analyze the image data from the RIP 106 to determine whether one or more pixels of a plurality of input pixels are separation overlay pixels having colorant requests from multiple continuous tone planes. The halftone determination system 108 is also configured to halftone the pages of the color image to produce an output color image.

In one embodiment, halftoning by the halftone determination system 108 is performed based on the following: if a page of the color image includes more than a threshold amount of separation overlay pixels and if a property of the separation overlay pixels exceeds a predetermined threshold value, then a first or base halftoning model of the image printing device is used to halftone that page of the color image, else a second or an optimal halftoning model is used to halftone that page of the color image, the second or optimal halftoning model comprising an adjustment of a property of a halftone dot in the output color image. For example, the property of the halftone dot includes a dot angle, a frequency or a dot pattern of the halftone dot.

The threshold amount of the separation overlay pixels includes a number of separation overlay pixels or a percentage of separation overlay pixels in a page of the input image. The threshold amount for the number of separation overlay pixels may be predetermined and may be set by a user. For example, if the threshold amount for the number of separation overlay pixels in a page of the input image is set as 10, then the first halftoning or base halftoning is designated only if the number of separation overlay pixels on a page of the input image is more than 10. In one embodiment, the threshold amount may be set to be low, for example, zero.

In one embodiment, the property of the separation overlay pixels includes a minimum value for each of the separation overlay pixels. The predetermined threshold value for the minimum value for each of the separation overlay pixels may be set by the user. That is, the predetermined threshold value for a minimum value for the separation overlay pixels must be exceeded before the first halftoning or base halftoning is designated. For example, if the predetermined threshold value is set to 50, then the first halftoning or base halftoning is designated only if the minimum value of separation overlay pixel is more than 50. If an input pixel has a black contone plane with a value of 200 and a cyan contone plane with a value of 2, then the first halftoning or base halftoning is not designated because the value of the cyan contone plane does not meet the predetermined threshold value of 50. That is, the pixel value below 50 is treated as the value of 0 for overlap computation purposes.

In one embodiment, the property of the separation overlay pixels includes a distance between the separation overlay pixels in a page of the input image. The predetermined threshold value for the distance between the separation overlay pixels in a page of the input image may be set by the user. For example, if an overlap is within an isolated pixel, then it is treated as the value of 0 for overlap computation purposes. That is, if isolated pixels scattered around the input image have an overlap, then it is treated as a value of 0 for overlap computation purposes. The first halftoning or base halftoning is designated only if there are a certain number of pixels in the same area (i.e., having a distance between the separation overlay pixels in a page of the input image less than a predetermined threshold) have an overlap.

In one embodiment, the property of the separation overlay pixels includes a minimum number of multiple color planes having colorant requests on the separation overlay pixel. For example, for a four color (or higher) image printing system, an overlap of two (or more) planes is acceptable for the application of the second or optimal halftoning and an overlap of three (or more) planes is acceptable for the application of the first or base halftoning.

In one embodiment, the property of the separation overlay pixels is a weighted combination of one or more properties of the separation overlay pixels, where the one or more properties of the separation overlay pixels includes a minimum value for each of the separation overlay pixels, a distance between the separation overlay pixels in a page of the input image and a minimum number of multiple color planes having colorant requests on the separation overlay pixel.

The halftone determination system 108 is also configured to record information about the multiple continuous tone planes having colorant requests on the separation overlay pixel on a halftone tag plane and a global tag. That is, the RIPed page's planes corresponding pixels are compared (e.g., at decompression time) for overlapping colorant requests and the results are recorded in a temporary comparison tag plane's pixels. The halftone tag plane and the global tag are embedded along with the image data.

In one embodiment, if the comparison plane or global "overlap" tag has any values of 1, the halftone tag plane for the entire page is converted to the value specifying the use of standard or base halftoning. The global "overlap" tag for the image is set to "overlap."

As will be discussed in detail below, the halftone determination system 108 is also configured to determine if at least one of the pages on a sheet side of the color image includes the separation overlay pixels and to use the first or base halftoning model for all the pages on that sheet side based on this determination.

Figure 3A:
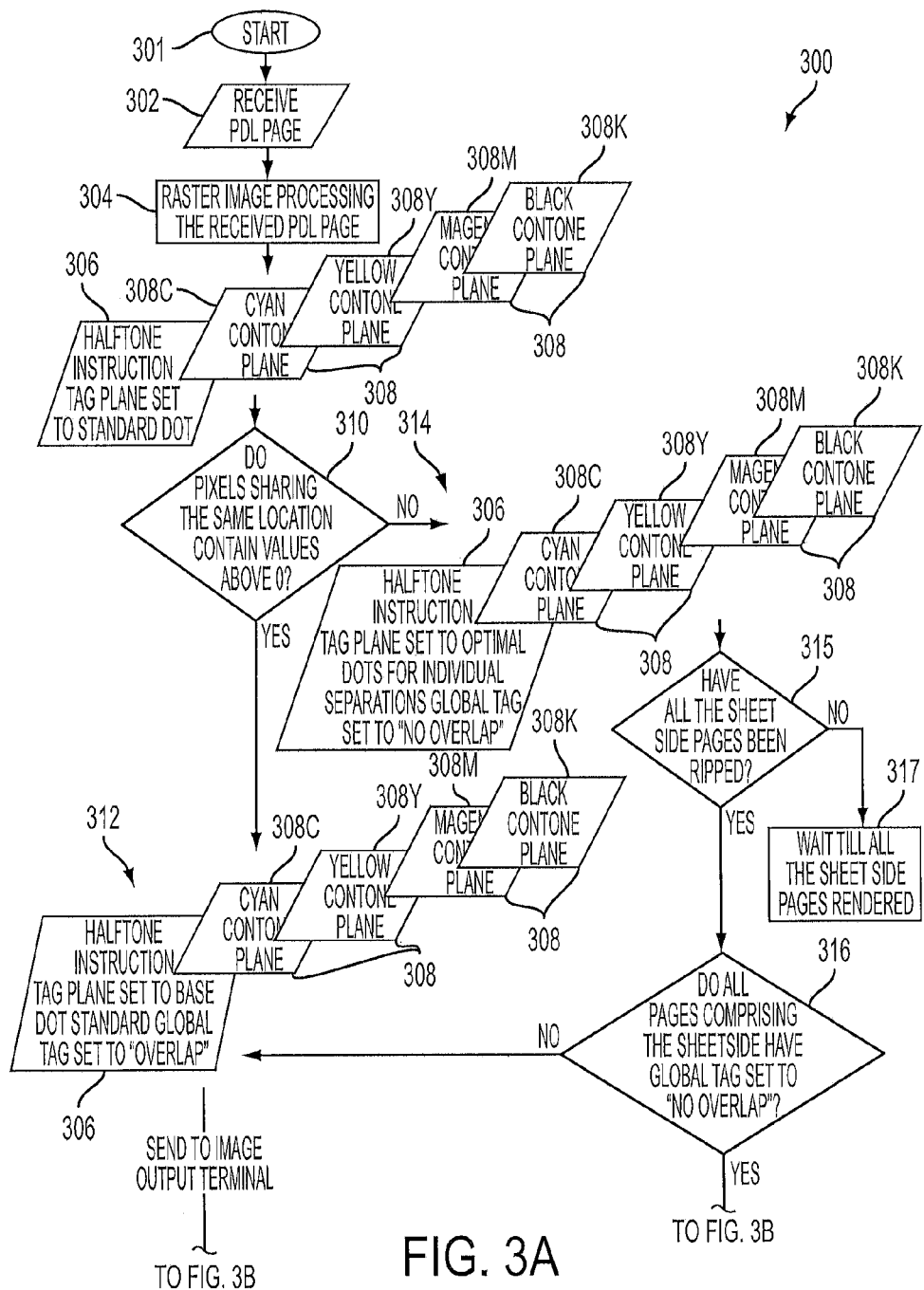
FIGS. 3A and 3B show an exemplary flowchart of a method for enabling halftoning of a color image based on its color separation content in accordance with an embodiment of the present disclosure.
Figure 3B:
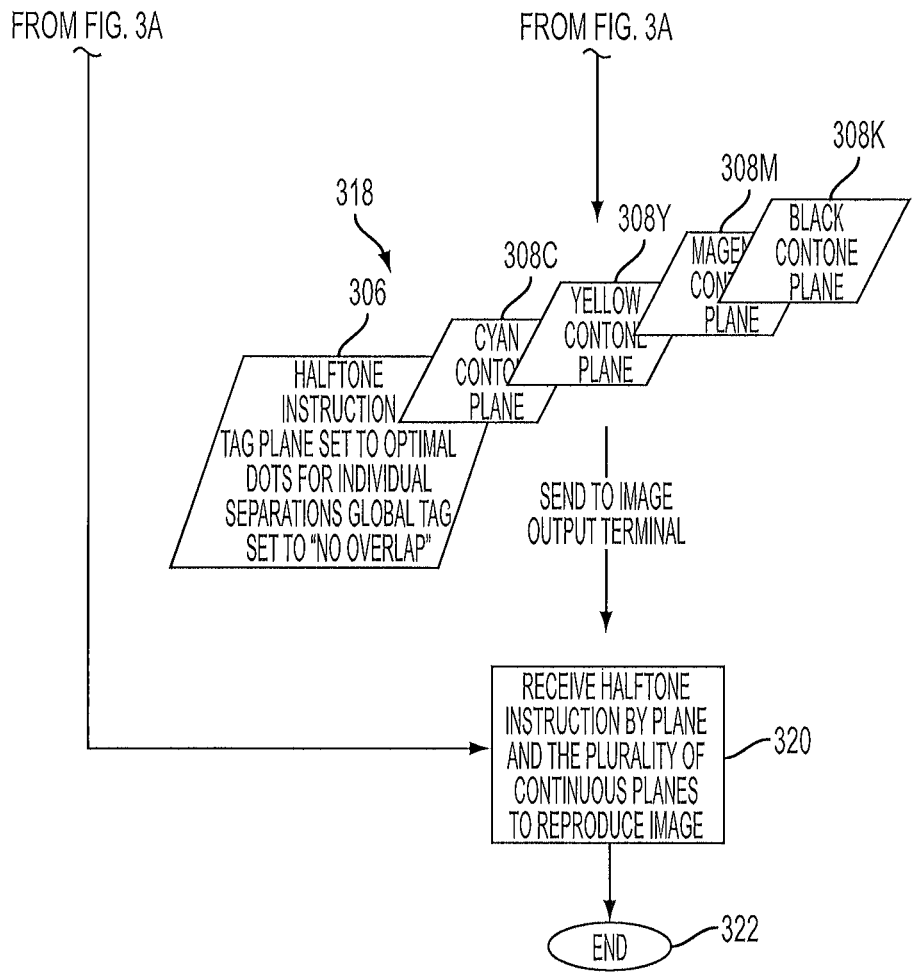

FIGS. 3A and 3B show an exemplary flowchart of a method 300 for enabling halftoning of a color image based on its color separation content. The method 300 is implemented in a computer system comprising one or more processors configured to execute one or more computer program modules. The method 300 begins at procedure 301.

Referring to FIGS. 1, 2, 3A, and 3B, at procedure 302, an input image is received by the DFE 102. The input color image is described as a plurality of input pixels. The input color image has one or more pages. In one embodiment, the input image may be Page Description Language (PDL) page(s). That is, the input image may include a page description in a high-level page description language.

At procedure 304, the received input color image is processed at the RIP 106 to generate image data. In one embodiment, the input (e.g., PDL) pages are Raster Image Processed (RIPed) to obtain continuous tone data or contone compressed format. That is, the image data includes a plurality of continuous tone planes 308. After the Raster Image Processing (RIPing), the continuous tone (contone) pages are generally imposed on sheet sides. For example, a two-up imposition results in two pages being put on a sheet side.

In one embodiment, the number of continuous tone planes in the contone data is dependent on the type of the image printing system. For example, for a four colorant (CMYK) print engine, the RIP 106 is configured to Raster Image Process (RIP) the input image containing CMYK content (i.e., Cyan (C) image content, Magenta (M) image content, Yellow (Y) image content, and Black (K) image content). As shown in the illustrated embodiment of FIGS. 3A and 3B, the DFE 102 may produce four image separations or color planes or continuous tone planes 308C, 308M, 308Y and 308K of an exemplary input color image (not shown). Although a four colorant image printing system (e.g., CMYK) is shown in the illustrated embodiment of FIGS. 3A and 3B, it is contemplated that the RIP 106 is configured to output two image planes for a highlight color image printing system, to output five image planes for a CMYK and a clear output image printing system, and to output six or more image planes for an N-color image printing system.

The image data may also include a halftone instruction tag plane 306. At Raster Image Processing (RiPing) time, halftone tag information (based on a Graphical User Interface (GUI) or PDL instructions) is imbedded with the RIPed planes that form the image to be printed on an Image Output Terminal (IOT). In one embodiment, the halftone instruction tag plane is set to a standard halftone dot or a base halftone dot on the print engine 104. That is, at Raster Image Processing (RIPing) time, the default halftone tagging associated with the (compressed) continuous tone image pixels specifies the use of the base halftone dot on the print engine.

The image data may also include a global "overlap" tag that is configured to record the information associated with the pixel(s) with the overlapping colorant requests. That is, at RIP time, a new global "overlap" tag for the page is set to "no-overlap."

The image data, including the halftone instruction tag plane 306 and a plurality of continuous tone planes 308, is then sent to the halftone determination system 108. At procedure 310, the processors of the halftone determination system 108 are configured to analyze the image data to determine whether one or more pixels of the plurality of input pixels are separation overlay pixels having colorant requests from multiple continuous tone planes.

That is, the processors of the halftone determination system 108 are configured to analyze Raster Image Processed (RIPed) pages and sheets to determine if separation overlays exist. The overlays are determined by comparing the overlapping pixels composing a page. In one embodiment, each input pixel is analyzed on a pixel-by-pixel basis.

At procedures 312 and 314, the processors of the halftone determination system 108 are configured to embed halftone instructions for the pages of the color image. These halftone instructions are used by the processors to produce a printer ready binary format via the halftoning process.

If a compared pixel results in a TRUE value (i.e., multiple planes have a colorant request on the same image pixel) at procedure 310, the halftone designation for the page's pixels uses an image printing device's standard halftoning. Specifically, the processors of the halftone determination system 108 are configured to embed halftone instructions for pages based on the following: if a page of the color image includes more than a threshold amount of separation overlay pixels and if a property of the separation overlay pixels exceeds a predetermined threshold value, then (at procedure 312) a first or base halftoning model of the image printing device is used to halftone that page of the color image, else (at procedure 314) a second or an optimal halftoning model is used to halftone that page of the color image, the second or optimal halftoning model comprising an adjustment of a property of a halftone dot in the output color image.

For example, in a four color image printing system, a pixel at a location of (20, 200) has the black contone plane with a value of 240 and the cyan contone plane with a value of 20. A value of 1 (i.e., overlap present) is entered in the comparison tag plane or global "overlap" tag.

If the comparison plane or global "overlap" tag has a value of 1, the halftone tag plane for the entire page is converted to the value specifying the use of base or first or standard halftoning. The global "overlap" tag for the image is set to "overlap."

In one embodiment, the "base" or standard or first halftone dot is a halftone dot designed for when all or most colorants are present within a pixel and across the page. For a CMYK image printing system, the "base" or standard or first halftone dot includes different dot angles for each separation, may include slightly different frequencies per channel or separation, and may include a different dot pattern per separation.

If a compared pixel results in a FALSE value (i.e., multiple planes do not have a colorant request on the same image pixel) at procedure 310, the halftone designation for the page's pixels uses a second or an optimized halftoning. Specifically, at procedure 314, the processors of the halftone determination system 108 are configured to halftone the pages of the color image using a second or an optimal halftoning model. That is, in one embodiment, if no overlap is determined, an optimal or second halftoning for the present separation (with a defined halftone dot pattern) is used.

In one embodiment, the second halftoning model is an optimal halftoning model that comprises an adjustment of a property of a halftone dot in the output color image. For example, the property of the halftone dot includes a dot angle, a frequency or a dot pattern of the halftone dot.

An optimal dot is the adjustment of dot angle and appropriate dot pattern on the dots applied to the planes that have overlapped content. For example, magenta may have a 45° angle dot applied for the "optimal" dot vs. a 60° angle dot applied for the "base" dot.

In one embodiment, the second or the optimal halftoning model includes a defined halftone dot pattern. Different optimal dots are applied for different colorant combinations. For example, the optimal dot combination for cyan/magenta pixels may be different from the optimal dot combination for black/magenta pixels.

For example, in a four color image printing system, a pixel at a location of (20, 300) has the black contone plane with a value of 24 and the cyan, magenta and yellow contone planes with a value of 0 each (i.e., no overlap present). A value of 0 (i.e., no overlap present) is entered in the comparison tag plane or global "overlap" tag.

In one embodiment of the present disclosure, a user may be able to select an option to use constant halftoning on a sheet-side. For example, the user may be able to make this selection using "YES" or "NO" choices available to the user via the Graphical User Interface (GUI).

If the setting of "YES" is selected by the user, then, at procedure 315, it is determined whether all the sheet side pages have been ripped or rendered.

If it is determined that all the sheet side pages have not been ripped or rendered, then, at procedure 317, the processor waits all the sheet side pages are rendered or ripped.

If it is determined that all the sheet side pages have been ripped or rendered, the global "overlap" tag of the pages composing the sheet side is interrogated, at procedure 316, at the time of page imposition.

If one of the pages on the sheet side has the value of "overlap," halftone designations of all the remaining pages on that sheet side are converted to base halftoning, standard halftoning or first halftoning.

If all of the pages on the sheet side have the value of "no overlap," then, at procedure 318, halftone designations of all of the pages on that sheet side are maintained as second or optimal halftoning.

The processors of the halftone determination system 108 are configured to output the results (i.e., halftone instruction tag plane and the plurality of continuous color planes) which can be printed by print engine 104 or stored by a storage device (not shown) for subsequent printing. Examples of the storage device may include one or more of a computer memory, such as random access memory (RAM) or storage media, such as, magnetic media including, but not limited to, magnetic tapes and discs and optical media such as CD ROM, etc. Furthermore, the storage device may include a computer network for transmitting output from the halftone determination system 108 to another processor, image processing system or rendering device. The printing engine 104 may include an ink jet print engine, xerographic print engine and electrophotographic print engine.

At procedure 320, the print engine 104 is configured to receive results (i.e., the halftone instruction tag plane and the plurality of continuous color planes) and to reproduce the image using the received results. The method 300 ends at procedure 322.

A display device (not shown) may be provided to enable the user to control various aspects of the system 108, in accordance with the embodiments disclosed therein. The system 108 includes one or more processors that execute, and a memory that stores, computer-executable instructions for carrying out the various procedures and performing the various functions described herein.

Thus, the present patent disclosure discloses analyzing the rendered pages from the DFE and determining which separations overlay. For example, if a color image is on the page, this is typically true for all separation pairs. A page of black text and a cyan logo which does not intersect is false for all separation pairs. A page with black text and a red logo which does not intersect is true for magenta yellow but is false for all other separation pairs. Halftones are selected based on the above information. These halftones are optimized when the number of overlapping colors is less than all the colors. The present patent application provides an improvement over current techniques that use only the halftone optimized when all colors overlay.

For the purposes of the discussion in the present disclosure, the "dot angle" of the halftone dot may generally be described as an angle formed with respect to the bottom page edge by nearest dot centers.

For the purposes of the discussion in the present disclosure, the "frequency" of the halftone dot may generally be described as an inverse of the distance between the nearest dot centers.

For the purposes of the discussion in the present disclosure, the "dot pattern" of the halftone dot may generally be described as a threshold array pattern that is of a fixed size. For example, a threshold array pattern may be compared with the digital input values. If the input digital value is greater than the array pattern number, a 1 is assigned and, if it is less, a 0 value is assigned. The threshold array pattern is, thus, used to determine whether pixel will be rendered as 1 ON or 0 OFF.

An "image" is a pattern of physical light or a collection of data representing said physical light and may include characters, words, and text as well as other features such as graphics. A "digital image", by extension, is an image represented by a collection of digital data. An image may be divided into "segments," each of which is itself an image. A segment of an image may be of any size up to and including the whole image.

In a digital image composed of data representing physical light, each element of data may be called a "pixel," which is common usage in the art and refers to a picture element. Each pixel has a location and value. Each pixel value may be one or more bits in a binary form, a gray scale value in a gray scale form, or a set of color space coordinates in a color coordinate form. The binary form, gray scale form, and color coordinate form may each form a two-dimensional array defining an image. An operation performs "image processing" when it operates on an item of data that relates to part of an image.

The "image data" refers to information in a form that can be digitally transmitted or processed. The "printing system" refers to an apparatus arrangement suited to accepting image data and rendering that image data upon a substrate.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for enabling halftoning of a color image based on its color separation content, the color image including a plurality of color separations, each color separation representing a distinct colorant of an image printing device, the method being implemented in a computer system comprising one or more processors configured to execute one or more computer program modules, the method comprising:

receiving a color image being described as a plurality of input pixels and having a plurality of pages;

processing the received color image to generate image data, the image data comprising a plurality of continuous tone planes;

analyzing the image data to determine whether one or more pixels of the plurality of input pixels are separation overlay pixels, the separation overlay pixels having colorant requests from multiple continuous tone planes; and halftoning the pages of the color image to produce an output color image based on the following:

if a page of the color image includes more than a threshold amount of separation overlay pixels and if a property of the separation overlay pixels exceeds a predetermined threshold value, then a first halftoning model of the image printing device is used to halftone that page of the color image, else a second halftoning model is used to halftone that page of the color image, the second halftoning model comprising an adjustment of a property of a halftone dot in the output color image.

2. The method according to claim 1, wherein the property of the halftone dot includes a dot angle, a frequency or a dot pattern of the halftone dot.

3. The method according to claim 1, further comprising recording information about the multiple continuous tone planes having colorant requests on the separation overlay pixel on a halftone tag plane.

4. The method according to claim 3, wherein the halftone tag plane is embedded along with the image data.

5. The method according to claim 1, wherein the threshold amount of separation overlay pixels includes a predetermined number of separation overlay pixels or a predetermined percentage of separation overlay pixels.

6. The method according to claim 1, wherein the threshold amount of separation overlay pixels is set by a user.

7. The method according to claim 1, wherein the property of the separation overlay pixels includes a minimum value for each of the separation overlay pixels.

8. The method according to claim 1, wherein the property of the separation overlay pixels includes a distance between the separation overlay pixels in a page of the color image.

9. The method according to claim 1, wherein the property of the separation overlay pixels includes a minimum number of multiple color planes having colorant requests on the separation overlay pixel.

10. The method according to claim 1, wherein the property of the separation overlay pixels is a weighted combination of one or more properties of the separation overlay pixels, wherein the one or more properties of the separation overlay pixels includes a minimum value for each of the separation overlay pixels, a distance between the separation overlay pixels in a page of the color image and a minimum number of multiple color planes having colorant requests on the separation overlay pixel.

11. The method according to claim 1, further comprising determining if at least one of the pages on a sheet side of the color image includes the separation overlay pixels, and using the first halftoning model for all the remaining pages on that sheet side based on the determination that the at least one of the pages on a sheet side of the color image includes the separation overlay pixels.

12. A system for enabling halftoning of a color image based on its color separation content, the color image including a plurality of color separations, each color separation representing a distinct colorant of an image printing device, the system comprising:
at least one processor configured to:
receive a color image being described as a plurality of input pixels and having a plurality of pages;
process the received color image to generate image data, the image data comprising a plurality of continuous tone planes;
analyze the image data to determine whether one or more pixels of the plurality of input pixels are separation overlay pixels, the separation overlay pixels having colorant requests from multiple continuous tone planes; and
halftone the pages of the color image to produce an output color image based on the following:
if a page of the color image includes more than a threshold amount of separation overlay pixels and if a property of the separation overlay pixels exceeds a predetermined threshold value, then a first halftoning model of the image printing device is used to halftone that page of the color image,
else a second halftoning model is used to halftone that page of the color image, the second halftoning model comprising an adjustment of a property of a halftone dot in the output color image.

13. The system according to claim 12, wherein the property of the halftone dot includes a dot angle, a frequency or a dot pattern of the halftone dot.

14. The system according to claim 12, wherein the one or more processors further configured to record information about the multiple continuous tone planes having colorant requests on the separation overlay pixel on a halftone tag plane.

15. The system according to claim 14, wherein the halftone tag plane is embedded along with the image data.

16. The system according to claim 12, wherein the threshold amount of separation overlay pixels includes a number of separation overlay pixels or a percentage of separation overlay pixels.

17. The system according to claim 12, wherein the threshold amount of separation overlay pixels is set by a user.

18. The system according to claim 12, wherein the property of the separation overlay pixels includes a minimum value for each of the separation overlay pixels.

19. The system according to claim 12, wherein the property of the separation overlay pixels includes a distance between the separation overlay pixels in a page of the color image.

20. The system according to claim 12, wherein the property of the separation overlay pixels includes a minimum number of multiple color planes having colorant requests on the separation overlay pixel.

21. The system according to claim 12, wherein the property of the separation overlay pixels is a weighted combination of one or more properties of the separation overlay pixels, wherein the one or more properties of the separation overlay pixels includes a minimum value for each of the separation overlay pixels, a distance between the separation overlay pixels in a page of the color image and a minimum number of multiple color planes having colorant requests on the separation overlay pixel.

22. The system according to claim 12, wherein the one or more processors further configured to determine if at least one of the pages on a sheet side of the color image includes the separation overlay pixels and use the first halftoning model for all the remaining pages on that sheet side based on the determination that the at least one of the pages on a sheet side of the color image includes the separation overlay pixels.

* * * * *